United States Patent
Silva et al.

(10) Patent No.: US 11,523,179 B2
(45) Date of Patent: Dec. 6, 2022

(54) SUPERVISOR MODULE FOR CRASH DETECTION AND MITIGATION

(71) Applicant: NCR Corporation, Atlanta, GA (US)

(72) Inventors: Sergio Silva, Atlanta, GA (US); John Crooks, Duluth, GA (US); Andrew Klenzak, Atlanta, GA (US)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 16/667,305

(22) Filed: Oct. 29, 2019

(65) Prior Publication Data

US 2021/0127161 A1   Apr. 29, 2021

(51) Int. Cl.
*H04N 21/4425* (2011.01)
*G06F 11/07* (2006.01)
*H04N 21/438* (2011.01)
*H04N 21/4402* (2011.01)

(52) U.S. Cl.
CPC ....... *H04N 21/4425* (2013.01); *G06F 11/079* (2013.01); *G06F 11/0793* (2013.01); *H04N 21/4384* (2013.01); *H04N 21/440236* (2013.01)

(58) Field of Classification Search
CPC .......... H04N 21/4425; H04N 21/4384; H04N 21/440236; G06F 11/079; G06F 11/0793
See application file for complete search history.

(56) References Cited

U.S. PATENT DOCUMENTS

| | | | |
|---|---|---|---|
| 2003/0169249 A1* | 9/2003 | Masuda | G09G 5/006 345/211 |
| 2008/0300815 A1* | 12/2008 | Kim | G09G 5/006 702/108 |
| 2012/0137180 A1* | 5/2012 | Shao | G06F 11/0751 714/37 |
| 2012/0252441 A1* | 10/2012 | Fujimoto | H04M 1/24 455/425 |
| 2013/0195420 A1* | 8/2013 | Biggs | H04N 9/8205 386/230 |
| 2014/0146183 A1* | 5/2014 | Ouyang | H04N 21/41415 348/180 |
| 2017/0039100 A1* | 2/2017 | Mashimo | G06F 11/0706 |
| 2017/0300371 A1* | 10/2017 | Soffer | G06F 11/3072 |
| 2019/0050115 A1* | 2/2019 | Krishna | G06F 3/04883 |
| 2019/0056985 A1* | 2/2019 | Farkas | G06F 11/0712 |
| 2019/0347154 A1* | 11/2019 | Mattia | G06F 11/0769 |
| 2020/0042377 A1* | 2/2020 | Brown | G06F 11/0793 |

* cited by examiner

*Primary Examiner* — Randy A Flynn
(74) *Attorney, Agent, or Firm* — Schwegman, Lundberg & Woessner (57) ABSTRACT

Disclosed is systems and methods for controlling a video display of a computing device during malfunction. The systems and methods can include receiving a first video stream and determining that the first video stream includes an error message for display on the video display. Once an error message is detected, a second video stream can be transmitted to the video display. The second video stream can include an alternate message for display on the video display.

20 Claims, 5 Drawing Sheets

SUPERVISOR MODULE FOR CRASH DETECTION AND MITIGATION

SUMMARY

Disclosed is systems and methods for controlling a video display of a computing device during malfunction. The systems and methods can include receiving a first video stream and determining that the first video stream includes an error message for display on the video display. Once an error message is detected, a second video stream can be transmitted to the video display. The second video stream can include an alternate message for display on the video display.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Public touch screen kiosks and electronic advertising displays sometimes crash due to fatal errors, blocking customers from entering food orders, reading menus, or otherwise receiving intended services. To add insult to injury, crashed systems display the infamous Android or Windows "Blue Screen of Death" (BSoD) or Linux kernel panic black screen. These screens leave customers with bad impressions of the retailer/restaurant, as well as the equipment vendor. Such crashed systems go unreported due to the bystander effect, delaying repair and making the problem worse.

Support teams need to reproduce and debug such system crashes, but do not know the precise events that led up to the crash. Existing system logs are limited and do not show what the user was doing at the time of the crash. It is challenging, if not impossible, for support teams to contact and interview the local users who witnessed the crash to learn more. Support teams need to remotely recover crashed systems wherever possible. Retailers/restaurants do not like support teams distracting local employees to reboot or diagnose remote systems and support teams do not like paying to dispatch field engineers.

Disclosed herein is a low-cost hardware module with an independent central processing unit that can be installed in the kiosk or media displays. The module monitors the kiosk or media display video streams for a BSoD or other trouble and replaces the BSOD with a different image. For example, the hardware module may cause the kiosk or media display to display an arrow to go to an adjacent kiosk, recovery instructions, or a message with a motivational "bounty" for users to call for support. The hardware module can also record video and touch events leading up to the problem and provide remote diagnostics to recover the kiosk or media display.

As disclosed herein, a low-cost independent embedded hardware module can be installed inside the kiosk, media player, or other device. The hardware module can monitor the device video that is transmitted to the device display. Should there be a fault or other malfunction that causes a BSoD the hardware module can take control of the device display to show recovery information.

Non-limiting examples of recovery information can include an arrow to re-direct customers to an adjacent kiosk, an out-of-order sign, advertising, recovery instructions, and/or a message with a motivational "bounty" for customers to contact the device support team. The hardware module can optionally record video and touch events leading up to the problem, automatically contact the device support team, and provide remote diagnostic and control functionality to recover the device.

Figure 1:
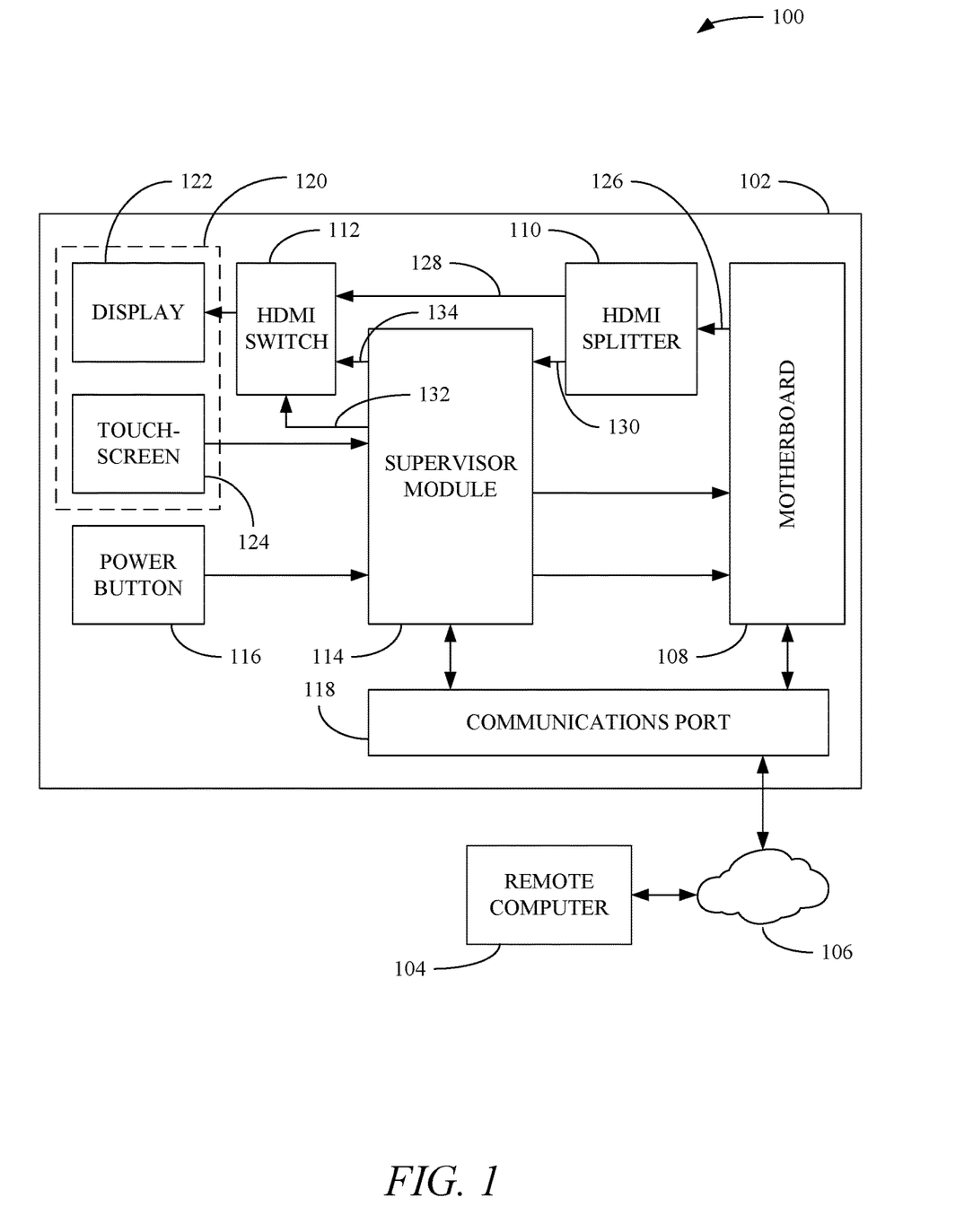
FIG. 1 illustrates a system in accordance with at least one example of this disclosure.

FIG. 1 illustrates a system 100 in accordance with at least one example of this disclosure. System 100 may include a display device 102 and a remote computer 104 that may be connected to display device 102 via a network 106. Display device 102 may include a motherboard 108, a High-Definition Multimedia Interface (HDMI) splitter 110, an HDMI switch 112, a supervisor module 114, a power button 116, a communications port 118, and a display 120. Display 120 may include a display screen 122 and a touchscreen 124. Display screen 122 may also be touchscreen 124. In other words, display screen 122 may be a touchscreen display.

During operation, motherboard 108 may transmit a first video signal 126 to HDMI splitter 110. HDMI splitter 110 may split first video signal 126 into two signals with a first signal 128 going to HDMI switch 112 and a second signal 130 going to supervisor module 114. When no errors are present, first signal 128 passes from HDMI splitter 110 to display 120 to be displayed.

When supervisor module 114 detects an error or other fault with display device 102, supervisor module 114 may transmit a switch signal 132 to HDMI switch 112. Switch signal 132 may cause first signal 128 to cease being transmitted to display 120 and cause a second video signal 134 to be transmitted to display 120 to be displayed. As disclosed herein, second video signal 134 may include an alternate message.

Display 120 may be used by customers to interact with display device 102. Display device 102 may be kiosk, a self-service terminal used to check at a brick and mortar retail store, an automated teller machine, etc. As disclosed herein, display 120 may include display screen 122 and touchscreen 124. Display screen 122 may be a touchscreen that combines display screen 122 and touchscreen 124 into a single unit.

Touchscreen 124 may be in electrical communication with supervisor module 114. During use, inputs received via touchscreen 124 can be transmitted to supervisor module 114 and then transmitted to motherboard 108 or other components of display device 102, such as a processor (not shown). By having inputs received at touchscreen 124 pass through supervisor module 114, supervisor module 114 may record inputs. As disclosed herein, the inputs may be recorded and used as stored in an error log that can be transmitted to remote computer 104 using communications port 118 and network 106. The recorded inputs can be used by technicians, programmers, etc. as an aid in diagnosing what may have contributed to a fault or other crash.

Communications port 118 can may allow display device 102 to communicate with various items. For example, communications port 118 may be USB ports, etc. that can be used to connect items such as display 120, motherboard 108, etc. Communications port 118 can provide data connections, such as Ethernet connections (wired or wireless), Bluetooth connections, etc., with different systems. For example, communications port 118 can allow supervisor module 114 and/or display device 102 to communication with remote computers, etc.

Power button 116 can be connected to supervisor module 114, which in turn can be connected to motherboard 108. Thus, when a user powers up display device 102 by pressing power button 116, supervisor module 114 can also be powered up.

Motherboard 108 can be video card that is a component of display device 102. Motherboard 108 is shown to be a representation of a component of display device 102. Motherboard 108 can be other components of display device 102, such as video cards, to which supervisor module 114 can be connected.

Supervisor module 114, motherboard 108, display 120, and any other component of display device 102 may be connected to a common bus, not shown, to receive power.

Figure 2:
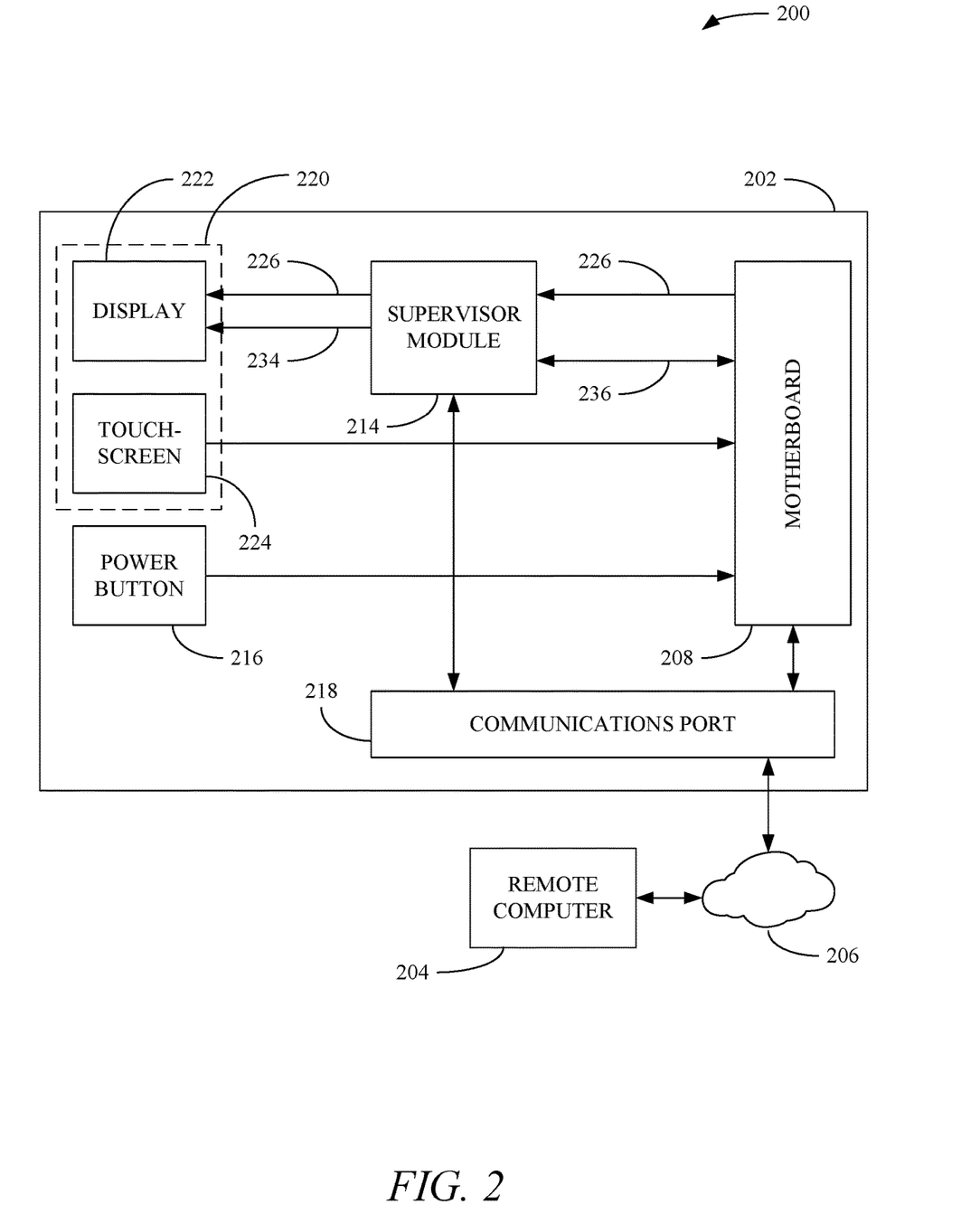
FIG. 2 illustrates a system in accordance with at least one example of this disclosure.

FIG. 2 illustrates a system 200 in accordance with at least one example of this disclosure. System 200 may include a display device 202 and a remote computer 204 that may be connected to display device 202 via a network 206. Display device 202 may include a motherboard 208, a supervisor module 214, a power button 216, a communications port 218, and a display 220. Display 220 may include a display screen 222 and a touchscreen 224. Display screen 222 may also be touchscreen 224. In other words, display screen 222 may be a touchscreen display.

During operation, motherboard 208 may transmit a first video signal 226 to supervisor module 224. When no errors are present, first video signal 226 passes from supervisor module 224 to display 120 to be displayed.

When supervisor module 21 detects an error or other fault with display device 202, supervisor module 214 may cause first video signal 226 to cease being transmitted to display 220 and cause a second video signal 234 to be transmitted to display 220 to be displayed. As disclosed herein, second video signal 234 may include an alternate message.

Display 220 may be used by customers to interact with display device 202. Display device 202 may be kiosk, a self-service terminal used to check at a brick and mortar retail store, an automated teller machine, etc. As disclosed herein, display 220 may include display screen 222 and touchscreen 224. Display screen 222 may be a touchscreen that combines display screen 222 and touchscreen 224 into a single unit.

Touchscreen 224 may be in electrical communication with motherboard 208. During use, inputs received via touchscreen 224 can be transmitted to motherboard 108 or other components of display device 202. Inputs received at touchscreen 224 and passed to motherboard 208 may be transmitted to supervisor module 214, which may record the inputs, via a signal 236. Signal 236 may allow inputs and other data to be passed to supervisor module 214 from motherboard 208. As disclosed herein, the inputs may be recorded and used as stored in an error log that can be transmitted to remote computer 204 using communications port 218 and network 206. The recorded inputs can be used by technicians, programmers, etc. as an aid in diagnosing what may have contributed to a fault or other crash.

Communications port 218 can may allow display device 202 to communicate with various items. For example, communications port 218 may be USB ports, etc. that can be used to connect items such as display 220, motherboard 208, etc. Communications port 218 can provide data connections, such as Ethernet connections (wired or wireless), Bluetooth connections, etc., with different systems. For example, communications port 218 can allow supervisor module 214 and/or display device 202 to communication with remote computers, etc.

Power button 216 can be connected to motherboard 208. Thus, when a user powers up display device 202 by pressing power button 216, signal 236 can be used to supply an activation signal to power cause supervisor module 214 to power up.

Motherboard 108 can be video card that is a component of display device 102. Motherboard 108 is shown to be a representation of a component of display device 102. Motherboard 108 can be other components of display device 102, such as video cards, to which supervisor module 114 can be connected.

Supervisor module 214, motherboard 208, display 220, and any other component of display device 202 may be connected to a common bus, not shown, to receive power.

As disclosed with respect to FIGS. 1 and 2, supervisor modules can be embedded within video displays, such as kiosks, self-service terminals, etc. The supervisor modules can also communicate direct through a retailer/restaurant computer network and monitor other peripheral output like the touch screen using communications ports, such as communications port 118 and 218. Remote supervisor modules can take remote control of kiosk power buttons and display outputs just as if the remote supervisor modules were integrated into the kiosks or other display devices.

Figure 3:
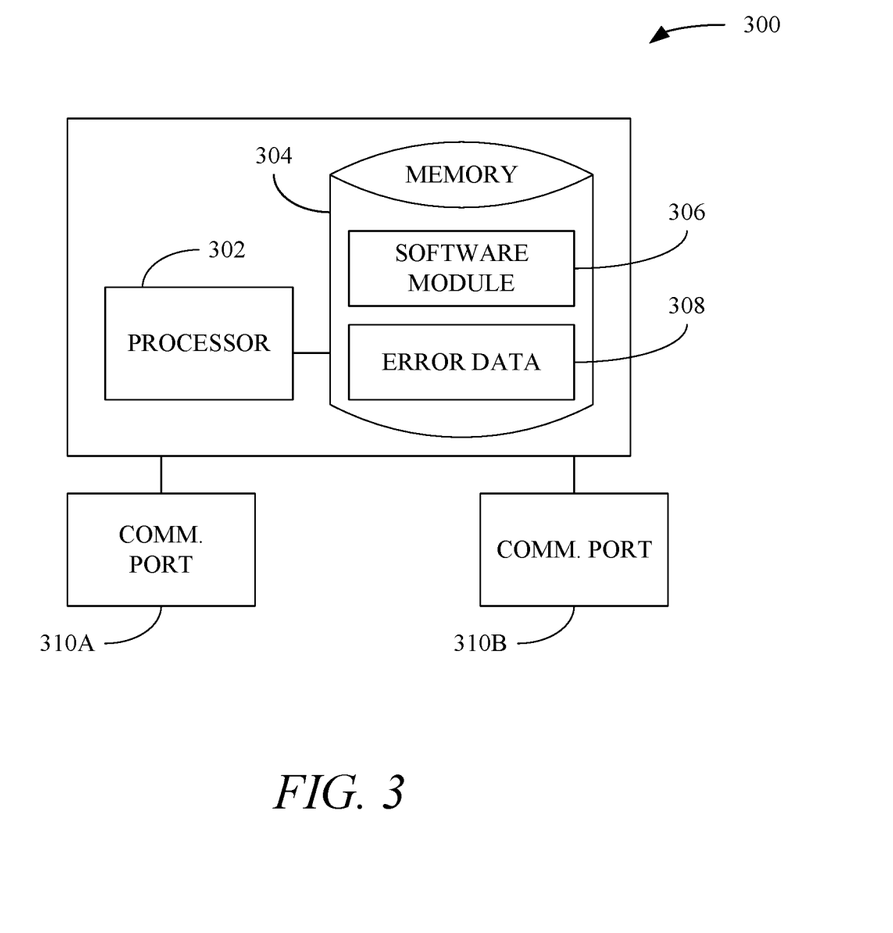
FIG. 3 illustrates a supervisor module in accordance with at least one example of this disclosure.

FIG. 3 illustrates a supervisor module 300, such as supervisor module 114 and 214, in accordance with at least one example of this disclosure. Supervisor module 300 may include a processor 302 and a memory 304. Memory 304 may include a software module 306 and error data 308. Software module 306, when executed by processor 302, may cause processor 302, or supervisor module 300, to perform actions and methods such as those described herein and with respect to FIG. 5. Software module 306 can also include an independent operating system executable by processor 302. For example, processor 302 can include an ARM processor running software module 306, which can be Yocto embedded Linux. Supervisor module 300 may also include communications ports 310 (labeled individually as 310A and 310B).

Communications ports 310 can may allow supervisor module 300 to communicate with various items. For example, communications ports 310 may be USB ports, serial ports, parallel ports, etc. that can be used to connect items such as displays, motherboards, video cards, etc. to supervisor module 300. Communications ports 310 can provide data connections, such as Ethernet connections (wired or wireless), Bluetooth connections, etc., with different systems. For example, communications ports 310 can allow supervisor module 300 to communication with remote computers, etc.

Figure 4A:
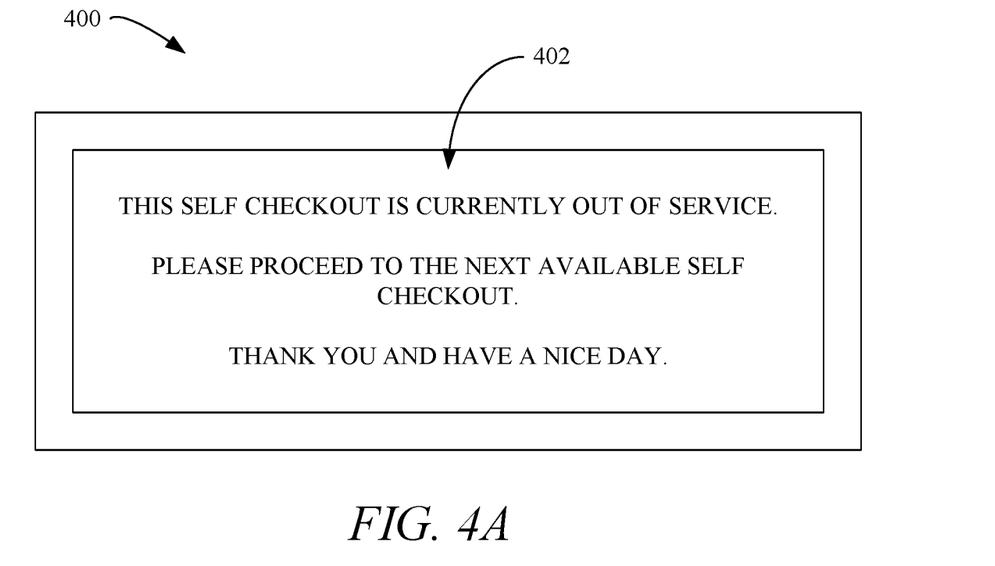
FIGS. 4A and 4B each illustrates an error screen in accordance with at least one example of this disclosure.
Figure 4B:
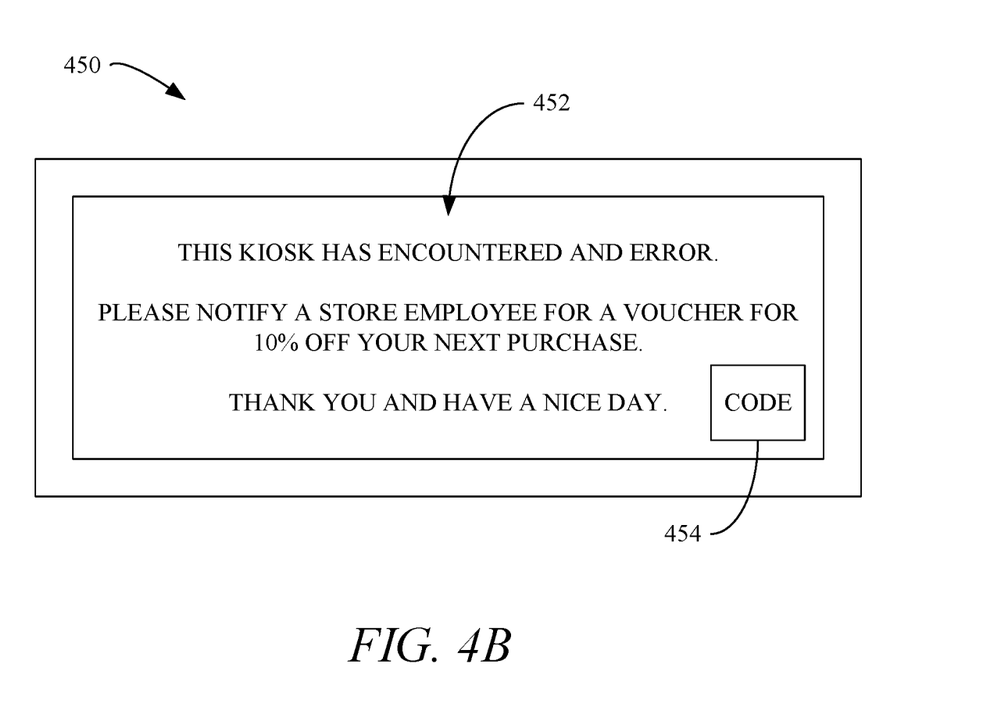

Error data 308 can include data used to identify an error as well as data used to respond to errors. For example, as disclosed herein, when an error occurs, an alternate error screen can be displayed and the image, text, or any combination thereof can be stored as error data 308. FIGS. 4A and 4B show examples of alternate error screens. As shown in FIG. 4A, an error screen 400 can include a text field 402.

Text field 402 can simply advise customers or other persons that may see a kiosk or self-service terminal that it is out of service and to proceed to the next available terminal.

FIG. 4B shows an error screen 450 that can include a text field 452. Text field 452 can simply advise customers or other persons that may see a kiosk or self-service terminal that it is out of service and offer them an incentive, such as X percent off a purchase. Error screen 450 can also include a code 454. Code 454 can be a QR code, an alphanumeric code, a barcode, etc. that a bystander can scan to claim the incentive. If the customer is scanning the code with a proprietary app, scanning the code can cause the customer's smartphone to transmit a message to the proprietor to alert the proprietor of the error. As such, code 454 can also identify the error that caused the malfunction.

In addition to alternate error screens that may be displayed, error data 308 can include images of known error frames. For example, a video signal received by supervisor module 300 can be parsed or otherwise broken down in to a plurality of frames. When an error occurs and the BSoD is sent to a display, frames of the BSoD can parsed from the video stream and compared to known images of error screens stored in error data 308. Examples of known images can include images of the BSoD, QR codes that may generated by the kiosk when an error occurs.

Error data 308 can also include known text and colors that appear in error screens. For example, known text may include alphanumeric codes that are displayed with an error occurs that identifies the error. The various alphanumeric codes may be stored as text strings in error data 308. Error screens may have standard colors that occupy a majority of the screen. For example, the BSoD is mostly blue. As a result, the color values for various pixel of the error screens can be stored in error data 308 for use in detecting an error screen.

As disclosed herein, supervisor module 300 and kiosk, self-service terminals, or other display devices, such as display devices 100 and 200 can share a common Ethernet connection to a store network, such as networks 106 and 206, via an Ethernet switch, such as communications ports 310, on supervisor module 300. This can allow supervisor module 300 to be installed in a kiosk, self-service terminals, or other display devices without requiring any changes to the kiosk, self-service terminals, or other display devices applications or platform software.

Figure 5:
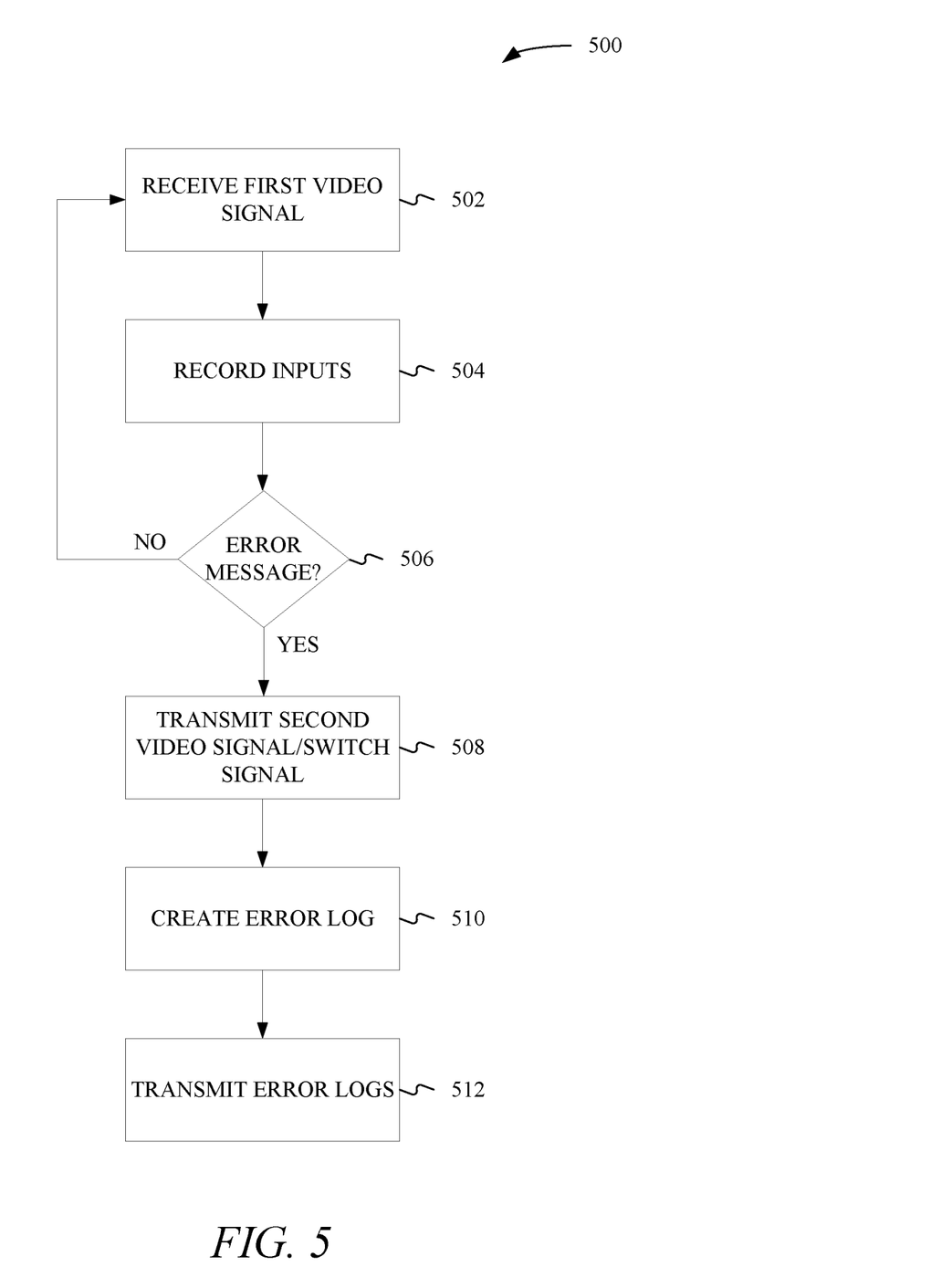
FIG. 5 illustrates a method in accordance with at least one example of this disclosure.

FIG. 5 illustrates a method 500 in accordance with at least one example of this disclosure. During operation a first video signal may be received by a supervisor module (502). For example, as disclosed herein, the first video signal can be an HDMI signal that is received from an HDMI splitter or directly from a video card, motherboard, or other component of a video display.

As the video signal is being received, the supervisor module may also record inputs (504). For instance, as disclosed herein, inputs from a touchscreen can be recorded. The recording of the inputs can occur in a loop. For example, when a customer first starts interacting with a kiosk, supervisor module can begin recording inputs. Once the customer has finished using the kiosk, the recorded inputs can be purged from the supervisor module's memory. Recording inputs can also include recording the video that is received by supervisor module. For instance, the supervisor module monitoring the kiosk can record a time-limited continuous loop of display and touch activity.

While receiving the first video signal, supervisor module can be analyzing the first video signal to determine if an error screen, such as a BSoD, is present in the first video signal (506). If an error is not detecting method 500 can return to stage 502 were a first video signal can be received. For example, when a first customer completes an interaction with the kiosk and no error has occurred, method 500 can return to stage 502 in preparation for a second customer's interaction with the kiosk.

A time-limited continuous loop of display and touch activity can be recorded. This loop can, for example, be configurable with a default of 5 minutes. To reduce hardware cost and guard against catastrophic hardware failure, the supervisor module can store the loop recording and any other captured diagnostics on an external USB Flash drive or other storage media.

Detecting the error message can occur in multiple manners. As one example, determining that the first video stream includes the error message can include receiving a known frame having the error message. The known frame can be stored in error data as disclosed herein. The known frame can be one of a plurality of known frames as disclosed herein.

The first video stream can be parsed into a plurality of frames and each of those frames can be compared to the known frame. The comparison of the frames to the known frame, or each of the plurality of known frames can be accomplished in a variety of manners. For example, each of the parsed frames can be converted into an image file and image analysis can be performed on the image files against the known frames. The image analysis can return a number, such as a number of pixels in the image file that matches pixels in the known frames. This number can be a actual number of pixels or a percentage of total pixels. If the returned number is greater than a predetermined threshold, say 75%, then there can be said to be a match between the image file and the known frame or frames.

In another example, pixel colors for each of the known frames can be compared against pixels of the image files. Just as with image analysis, a number of pixels in the image files that have the same color as the known frames can be used to determine if an error message is present.

The image analysis and color comparison can include creating a color histogram analysis and check for intense, narrow bands of white and blue. Some Windows BSoD's include a QR code indicating an error number. The module can run the image through a barcode decoder, such as for example the open source ZXing package, to look for the QR code. The supervisor module can also use a neural net trained to recognize a range of different style BSoDs.

Monitoring for an error can also include connections to external systems that may be connected to the kiosk. For example, if the kiosk requires a continuous connection to a server (such as a price look up server, streaming video media server, etc.), the supervisor module may continuously monitor the connection to the server independent from the kiosk. For instance, the supervisor module could ping the server, and log when the ping fails. The failed ping can provide additional diagnostic information for debugging future kiosk problems.

If an error message is detected then a second video signal and/or switch signal can be transmitted (508). For example, as disclose with respect to FIG. 1, a switch signal can be transmitted to and HDMI switch to terminal the first signal being sent to the display and a second video signal can be transmitted from the supervisor module to the display to replace the error screen. As disclosed with respect to FIG. 2, the first video signal can be terminated by supervisor module and a second video signal with a new message can be send from supervisor module to the display.

Once the second video signal is transmitted an error log can be created (510). The error log can include the recording of the inputs that occurred during the customer's interaction with the kiosk. The error log can also include snippets or other indications of programs that were being executed when the error occurred. For example, if a subroutine was being executed when the error occurred, the subroutine can be identified in the error log.

Once the error log is created, the error log can be transmitted to a remote computer (512). For example, the error log can be transmitted to software developers, service technicians, and/or other store personnel so that maintenance can be performed to return the kiosk to service. Using the error logs and communications ports on the supervisor module and/or kiosk, a support team can remotely diagnose and fixes the kiosk problem through using the supervisor module. For example, as shown in FIG. 1, the supervisor module can be included in the power on loop so the support team can shut down and restart the kiosk remotely.

As part of the remote diagnostics, supervisory module can include a support tool that can be used by service personnel. For example, when the service personnel approaches the kiosk, he or she may deploy a service tool stored on supervisor module to diagnose and repair the kiosk. The service took could be launched by the service personnel pressing a recovery button on the touchscreen and entering a password or other credentials. The credentials can be used to prevent non-service personnel from accessing the recovery tool.

The recovery button may also be used to reboot the kiosk. For example, a customer can press the recovery button and the supervisor module can reboot the kiosk by controlling the power button.

The supervisor module can also display a hidden touch screen button. For example, by touching the store's displayed logo, recovery instructions can be displayed on the display.

One skilled in the art will understand from this disclosure that the stages of method 500 can be rearranged and/or omitted and still be consistent with this disclosure. For example, the error log does not have to be transmitted. The error log can be saved to memory of the supervisor module and retrieved by service personnel when the kiosk is serviced.

The above discussion is intended to provide an overview of subject matter of the present patent application. It is not intended to provide an exclusive or exhaustive explanation of the invention. The description below is included to provide further information about the present patent application.

EXAMPLES

Example 1 is a method for controlling a video display of a computing device during malfunction, the method comprising: receiving, at a supervisor module comprising a processor, a first video stream; determining, by the supervisor module, that the first video stream includes an error message for display on the video display; and transmitting, by the supervisor module, a second video stream to the video display when the first video stream includes the error message, the second video stream including an alternate message for display on the video display.

In Example 2, the subject matter of Example 1 optionally includes transmitting the first video stream to the video display when the first video stream does not include the error message.

In Example 3, the subject matter of any one or more of Examples 1-2 optionally include wherein determining that the first video stream includes the error message includes: receiving a known frame having the error message; parsing the first video stream into a plurality of frames; and comparing each of the plurality of frames to the known frame.

In Example 4, the subject matter of Example 3 optionally includes wherein comparing each of the plurality of frames to the known frame includes: converting each of the plurality of frames to an image file; and performing image analysis of the image files for the plurality of frames against an image file for the known frame.

In Example 5, the subject matter of any one or more of Examples 3-4 optionally include wherein comparing each of the plurality of frames to the known frame includes: converting each of the plurality of frames to an image file; and performing object character recognition (OCR) on each of the image files for the plurality of frames; and search each of the image files for text matching known error text.

In Example 6, the subject matter of any one or more of Examples 1-5 optionally include wherein determining that the first video stream includes the error message includes comparing pixel colors for a portion of the first video stream against a known pixel color for the error message.

In Example 7, the subject matter of any one or more of Examples 1-6 optionally include creating an error log, the error log including a record of user inputs and a record of video frames from the first video stream for a predefined time period prior to detection of the error message.

In Example 8, the subject matter of Example 7 optionally includes transmitting the error log to a remote computing device.

In Example 9, the subject matter of any one or more of Examples 1-8 optionally include wherein transmitting the second video to the video display includes transmitting a switching signal to a High-Definition Multimedia Interface (HDMI) switch.

In Example 10, the subject matter of any one or more of Examples 1-9 optionally include wherein receiving the first video stream includes receiving the first video stream from a High-Definition Multimedia Interface (HDMI) splitter.

Example 11 is a supervisor module comprising: a processor; and a memory storing instructions that, when executed by the processor, cause the processor to perform actions comprising: receiving a first video stream associated with a video display, determining that the first video stream includes an error message for display on the video display, and transmitting a second video stream to the video display when the first video stream includes the error message, the second video stream including an alternate message for display on the video display.

In Example 12, the subject matter of Example 11 optionally includes wherein the actions further comprise transmitting the first video stream to the video display when the first video stream does not include the error message.

In Example 13, the subject matter of any one or more of Examples 11-12 optionally include wherein determining that the first video stream includes the error message includes: receiving a known frame having the error message; parsing the first video stream into a plurality of frames; and comparing each of the plurality of frames to the known frame.

In Example 14, the subject matter of any one or more of Examples 11-13 optionally include wherein the actions further comprise: creating an error log, the error log including a record of user inputs and a record of video frames from the first video stream for a predefined time period prior to detection of the error message; and transmitting the error log to a remote computing device.

In Example 15, the subject matter of any one or more of Examples 11-14 optionally include wherein the supervisor module is a component of a kiosk.

Example 16 is a display device comprising: a video card; a video display in electrical communication with the video card; and a supervisor module in electrical communication with the video display and video card, the supervisor module operative to perform actions comprising: receiving a first video stream, determining that the first video stream includes an error message for display on the video display, and transmitting a second video stream to the video display when the first video stream includes the error message, the second video stream including an alternate message for display on the video display.

In Example 17, the subject matter of Example 16 optionally includes a High-Definition Multimedia Interface (HDMI) switch in electrical communication with the video display, wherein transmitting the second video to the video display includes transmitting a switching signal to the HDMI switch.

In Example 18, the subject matter of any one or more of Examples 16-17 optionally include a High-Definition Multimedia Interface (HDMI) splitter in electrical communication with the video display and the supervisor module, wherein receiving the first video stream includes receiving the first video stream from the HDMI splitter.

In Example 19, the subject matter of any one or more of Examples 16-18 optionally include wherein the actions further comprise: creating an error log, the error log including a record of user inputs and a record of video frames from the first video stream for a predefined time period prior to detection of the error message; and transmitting the error log to a remote computing device.

In Example 20, the subject matter of any one or more of Examples 16-19 optionally include wherein determining that the first video stream includes the error message includes: receiving a known frame having the error message; parsing the first video stream into a plurality of frames; and comparing each of the plurality of frames to the known frame.

In Example 21, the apparatuses or method of any one or any combination of Examples 1-20 can optionally be configured such that all elements or options recited are available to use or select from.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A method for controlling a video display of a computing device during malfunction, the method comprising:
   receiving, at a supervisor module comprising a processor, a first video stream;
   determining, by the supervisor module, that the first video stream includes an error message for display on the video display;
   transmitting, by the supervisor module, a second video stream to the video display when the first video stream includes the error message, the second video stream including an alternate message and a code scannable by a bystander for display on the video display;
   receiving, at the supervisor module, an input from a hidden touchscreen button displayed on the video display, the hidden touchscreen button being a logo displayed on the video display, and
   transmitting, by the supervisor module, recovery instructions for display to the video display in response to the input from the hidden touchscreen button.

2. The method of claim 1, further comprising transmitting the first video stream to the video display when the first video stream does not include the error message.

3. The method of claim 1, wherein determining that the first video stream includes the error message includes:
   receiving a known frame having the error message;
   parsing the first video stream into a plurality of frames; and
   comparing each of the plurality of frames to the known frame.

4. The method of claim 3, wherein comparing each of the plurality of frames to the known frame includes:
   converting each of the plurality of frames to an image file; and
   performing image analysis of the image files for the plurality of frames against an image file for the known frame.

5. The method of claim 3, wherein comparing each of the plurality of frames to the known frame includes:
   converting each of the plurality of frames to an image file; and
   performing object character recognition (OCR) on each of the image files for the plurality of frames; and
   search each of the image files for text matching known error text.

6. The method of claim 1, wherein determining that the first video stream includes the error message includes comparing pixel colors for a portion of the first video stream against a known pixel color for the error message.

7. The method of claim 1, further comprising creating an error log, the error log including a record of user inputs and a record of video frames from the first video stream for a predefined time period prior to detection of the error message.

8. The method of claim 7, further comprising transmitting the error log to a remote computing device.

9. The method of claim 1, wherein transmitting the second video to the video display includes transmitting a switching signal to a High-Definition Multimedia Interface (HDMI) switch.

10. The method of claim 1, wherein receiving the first video stream includes receiving the first video stream from a High-Definition Multimedia Interface (HDMI) splitter.

11. A supervisor module comprising:
    a processor; and
    a memory storing instructions that, when executed by the processor, cause the processor to perform actions comprising:
       receiving a first video stream associated with a video display,
       determining that the first video stream includes an error message for display on the video display,
       transmitting a second video stream to the video display when the first video stream includes the error message, the second video stream including an alternate message and a code scannable by a bystander for display on the video display,
       receiving an input from a hidden touchscreen button displayed on the video display, the hidden touchscreen button being a logo displayed on the video display, and
       transmitting recovery instructions for display on the video display in response to the input from the hidden touchscreen button.

12. The supervisor module of claim 11, wherein the actions further comprise transmitting the first video stream to the video display when the first video stream does not include the error message.

13. The supervisor module of claim 11, wherein determining that the first video stream includes the error message includes:
    receiving a known frame having the error message;
    parsing the first video stream into a plurality of frames; and
    comparing each of the plurality of frames to the known frame.

14. The supervisor module of claim 11, wherein the actions further comprise:
    creating an error log, the error log including a record of user inputs and a record of video frames from the first video stream for a predefined time period prior to detection of the error message; and
    transmitting the error log to a remote computing device.

15. The supervisor module of claim 11, wherein the supervisor module is a component of a kiosk.

16. A display device comprising:
    a video card;
    a video display in electrical communication with the video card; and
    a supervisor module in electrical communication with the video display and video card, the supervisor module operative to perform actions comprising:
       receiving a first video stream,
       determining that the first video stream includes an error message for display on the video display,
       transmitting a second video stream to the video display when the first video stream includes the error message, the second video stream including an alternate message and a code scannable by a bystander for display on the video display,
       receiving an input from a hidden touchscreen button displayed on the video display, the hidden touchscreen button being a logo displayed on the video display, and
       transmitting recovery instructions to the video display in response to the input from the hidden touchscreen button.

17. The display device of claim 16, further comprising a High-Definition Multimedia Interface (HDMI) switch in electrical communication with the video display, wherein transmitting the second video to the video display includes transmitting a switching signal to the HDMI switch.

18. The display device of claim 16, further comprising a High-Definition Multimedia Interface (HDMI) splitter in electrical communication with the video display and the supervisor module, wherein receiving the first video stream includes receiving the first video stream from the HDMI splitter.

19. The display device of claim 16, wherein the actions further comprise:
    creating an error log, the error log including a record of user inputs and a record of video frames from the first video stream for a predefined time period prior to detection of the error message; and
    transmitting the error log to a remote computing device.

20. The display device of claim 16, wherein determining that the first video stream includes the error message includes:
    receiving a known frame having the error message;
    parsing the first video stream into a plurality of frames; and
    comparing each of the plurality of frames to the known frame.

* * * * *